US008502118B2

(12) United States Patent
Li et al.

(10) Patent No.: US 8,502,118 B2
(45) Date of Patent: Aug. 6, 2013

(54) ENERGY-SAVING AND HEAT PRESERVATION DEVICE

(75) Inventors: Yu-Chu M. Li, Tainan (TW); Yan-Hong A. Chan, Tainan (TW); Cheng-Hao Huang, Chiayi County (TW); Sing-Jie Yan, Keelung (TW)

(73) Assignee: Southern Taiwan University of Technology, Tainan (TW)

( * ) Notice: Subject to any disclaimer, the term of this patent is extended or adjusted under 35 U.S.C. 154(b) by 140 days.

(21) Appl. No.: 13/030,302

(22) Filed: Feb. 18, 2011

(65) Prior Publication Data
US 2012/0211483 A1 Aug. 23, 2012

(51) Int. Cl.
*F27D 11/00* (2006.01)

(52) U.S. Cl.
USPC .......... 219/439; 432/30; 432/32; 165/104.15; 165/104.17; 165/104.18

(58) Field of Classification Search
USPC .......... 219/439; 165/104.11, 104.15, 104.19, 165/10, 11.1, 104.17, 104.18; 116/200, 207, 116/216; 432/30, 32
See application file for complete search history.

(56) References Cited

U.S. PATENT DOCUMENTS

| 5,731,568 | A  | * | 3/1998 | Malecek | 219/209 |
| 6,573,470 | B1 | * | 6/2003 | Brown et al. | 219/86.51 |
| 6,606,937 | B2 | * | 8/2003 | Lassota | 99/290 |
| 6,725,907 | B2 | * | 4/2004 | Sone | 165/104.21 |

FOREIGN PATENT DOCUMENTS

WO   WO 2010041003 A1 *  4/2010

* cited by examiner

*Primary Examiner* — Tu B Hoang
*Assistant Examiner* — Amit K Singh
(74) *Attorney, Agent, or Firm* — Rosenberg, Klein & Lee

(57) ABSTRACT

An energy-saving and heat preservation device is mainly a heat preservation device for heating device and receptacle. Upper and lower receiving slots opened to outside and opposite to upper and lower ends of a receptacle respectively are provided in the heating device, while a first and a second chambers opposite to each other are provided in the heat preservation device. Energy storage material, which is a reversible phase-change material, is received within the first chamber. A conduit is connected between the first and the second chambers to form an integral connection arrangement. Hence, waste heat generated in the heating process is collected and stored, and is used for heat preservation. Not only the exhausted waste heat, which later becomes heat load of air conditioning apparatus, can be reduced but also power consumption for heat preservation can be lowered.

3 Claims, 5 Drawing Sheets

ENERGY-SAVING AND HEAT PRESERVATION DEVICE

BACKGROUND OF THE INVENTION

1. Field of the Invention

The present invention relates to an energy-saving and heat preservation device, more particularly to an energy-saving and heat preservation device by which waste heat generated in the heating process of object to be heated is collected and stored, and is used for heat preservation with respect to the heated object. Not only the exhausted waste heat, which later becomes heat load of air conditioning apparatus, can be reduced, but also power consumption for heat preservation can be lowered, so that practical effect and features in its overall implementation can be enhanced.

2. Brief Description of Prior Art

Accompanying the gradual upgrade of people's living standard, happy life, commonly known as LOHAS, has become a trend and a new indicator of people's lives nowadays to pursue. Various appliances for living convenience have been developed one after another to fulfill the demand of living a happy life. As to heating appliances such as coffee machine or tea machine, heat preservation is conducted for objects to be heated after they are heated to a certain temperature so that power has to be supplied uninterruptedly for heat preservation so as to allow users to enjoy hot beverages or foods.

The above heating appliances can achieve expected effect of heat preservation for objects to be heated by uninterrupted supply of power, but it is found in practical implementation that these products may not be consistent with the growing trend of green advocacy, the mainstream slogan of which is energy-saving and carbon reduction. In addition, electrical appliances are usually subject to the norms of energy efficiency, and each company also highlights its products as green products, the definition of which requires products have less impact on the environment or are less detrimental to human health, or typically be formed or part-formed from recycled components, or be manufactured in a more energy-conservative way. Based on the above, the conventional heating appliances still have room for improvement on the designs of overall structures.

In view of the above reasons, the inventor of the present invention hereby proposes a novel energy-saving and heat preservation device according to the state-of-art research and improvement conducted on conventional structure and based on his abundant experience of R&D and manufacturing in relevant field and skillful contemplation in many ways.

SUMMARY OF INVENTION

The energy-saving and heat preservation device of this invention mainly has a heating device for conducting heating, which is connected with a receptacle for receiving objects to be heated. A heat preservation device is provided with respect to the heating device and the receptacle. Upper and lower receiving tanks opened to outside and opposite to upper and lower ends of the receptacle respectively are provided in the heating device, while the heat preservation device is provided with a first and a second chambers opposite to each other. Energy storage material, being a type of reversible phase-change material, is received within the first chamber. A conduit is connected between the first and the second chambers to form an integral connection arrangement among the first and the second chambers and the conduit. Configuring like this, the waste heat such as vapor generated in the heating process conducted by the heating device is utilized to heat the first chamber provided in the upper receiving tank, and thus the energy storage material disposed therein is melted into liquid which then flows into the second chamber provided in the lower receiving tank and is conducted with heat preservation therein. After the heat absorbed by the liquid energy storage material is gradually dispersed, the energy storage material is solidified again into solid phase, and then the first and the second chambers integrally connected with the conduit are taken out respectively from the upper and the lower receiving tanks of the heat preservation device and rotated 180 degrees for repeated usage in energy storage and heat preservation. In this manner, the waste heat generated in the heating process of object to be heated is collected and stored, and is used for heat preservation with respect to the heated object. Not only can the exhausted waste heat, which later becomes heat load of air conditioning apparatus, be reduced, but also the power consumption for heat preservation can be lowered. Therefore, the practical performance and features in its overall implementation can be enhanced.

DETAILED DESCRIPTION OF PREFERRED EMBODIMENTS

The objects, the technical contents and the expected effectiveness of the present invention will become more apparent from the detailed description of the preferred embodiments in conjunction with the accompanying drawings.

Figure 1:
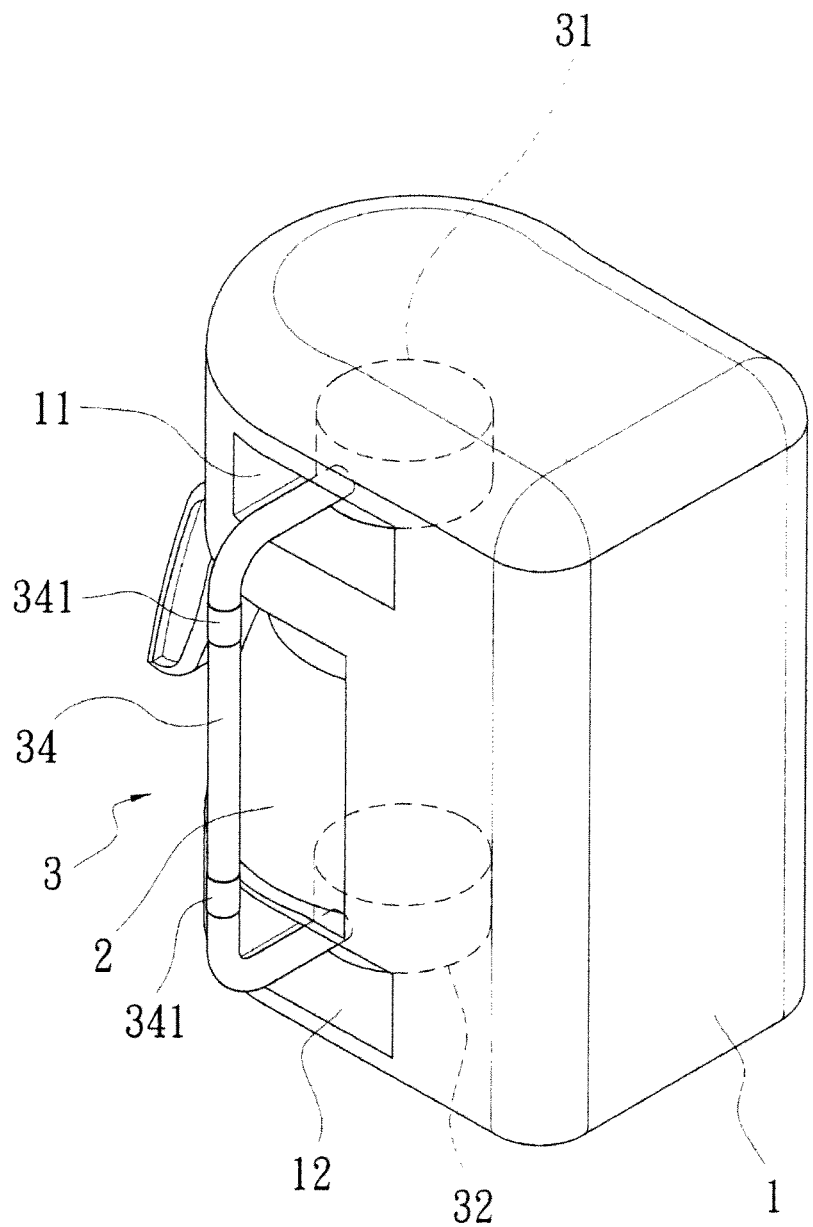
FIG. 1 is a perspective schematic view showing the structure of the energy-saving and heat preservation device embodying the present invention.
Figure 2:
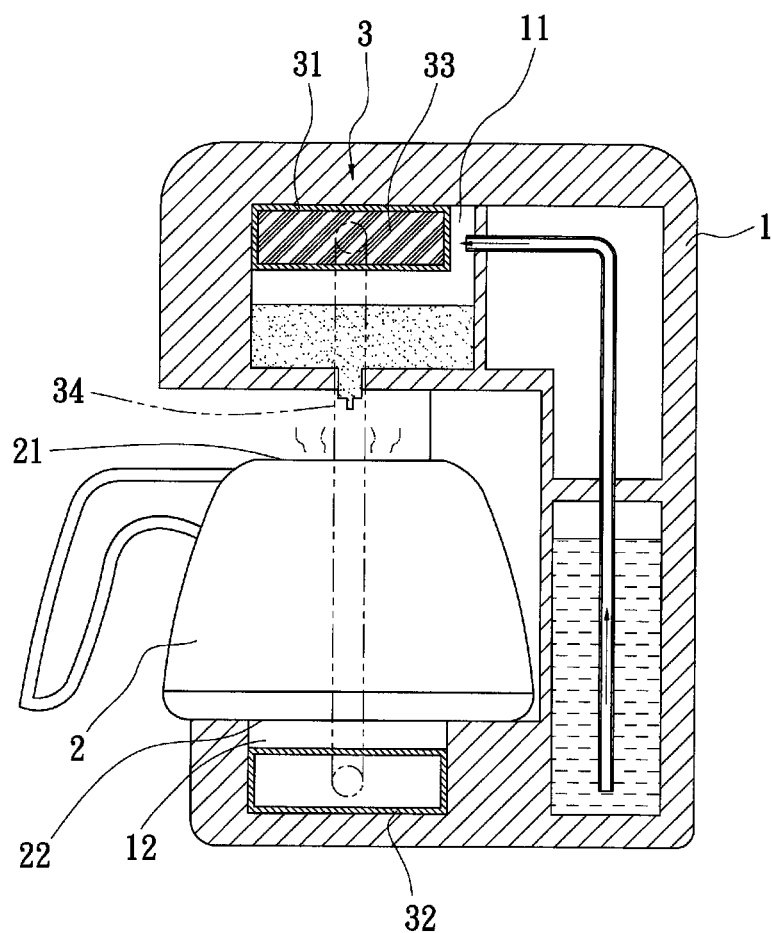
FIG. 2 is a sectional schematic view showing the structure of the energy-saving and heat preservation device of the present invention.

Firstly referring to FIGS. 1 and 2, the present invention has a heating device (1) and a receptacle (2) connected therewith. The heating device (1) is for conducting heating, while the receptacle (2) is for receiving objects to be heated. A heat preservation device (3) is provided with respect to the heating device (1) and the receptacle (2).

Upper and lower receiving tanks (11), (12) opened to outside and opposite to the upper and lower ends of the receptacle (2) respectively are provided in the heating device (1), while a first and a second chambers (31), (32) opposite to each other are provided in the heat preservation device (3). Energy storage material (33), being a coagulation type phase-change material such as paraffin, is received within the first chamber (31). A conduit (34) is connected between the first and the second chambers (31), (32) to form an integral connection arrangement among the first and the second chambers (31), (32) and the conduit (34). Further, heat discoloration patches (341) with respect to the first and the second chambers (31), (32) respectively are provided on the surface of the conduit (34), so as to sense the phase change status of the energy storage material (33) between the first and the second chambers (31), (32).

Figure 3:
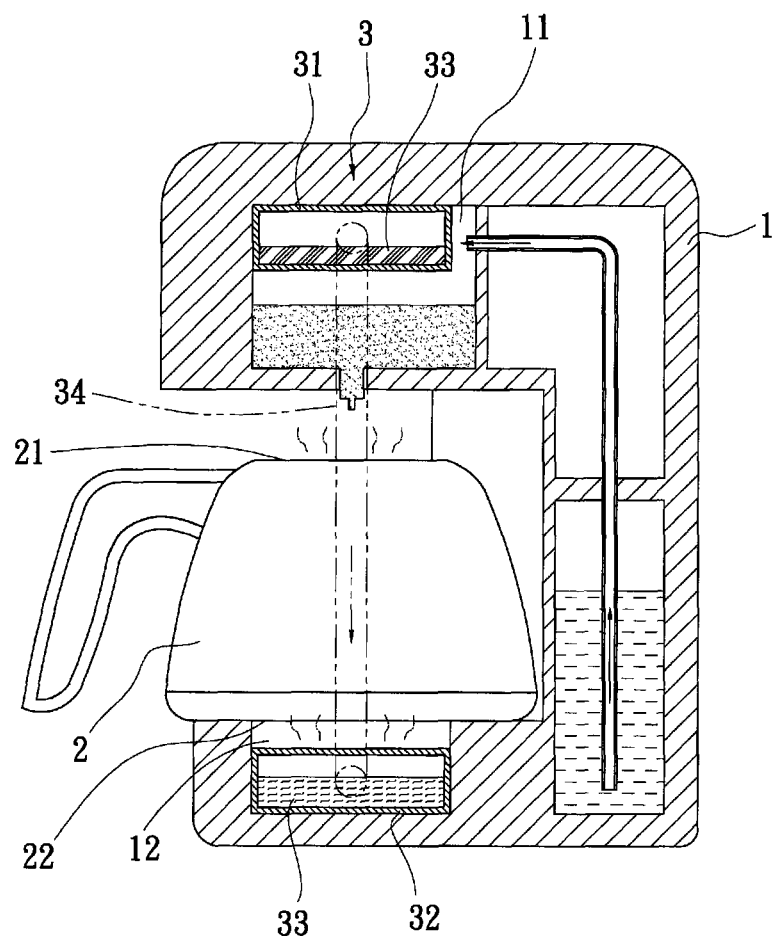
FIG. 3 is a sectional schematic view showing the implementation state of the energy-saving and heat preservation device of the present invention.
Figure 4:
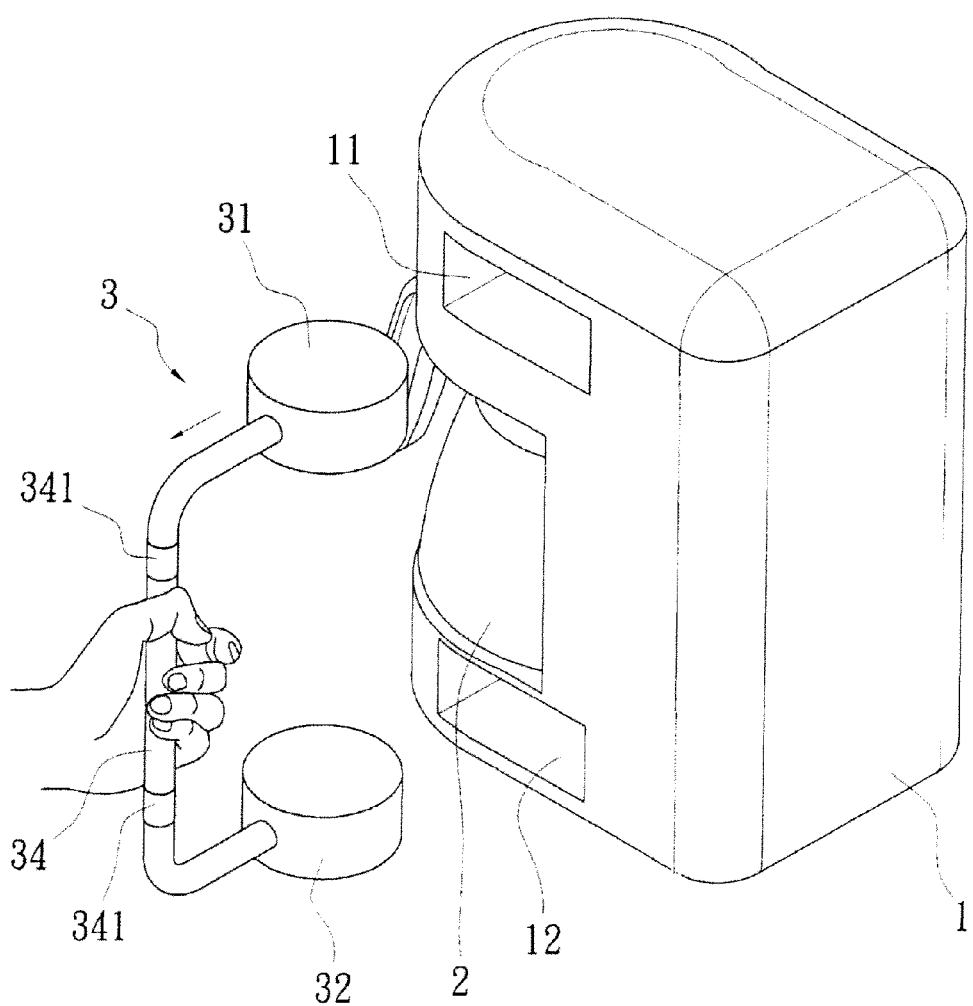
FIG. 4 is a view showing the action of usage and operation of the energy-saving and heat preservation device of the present invention.
Figure 5:
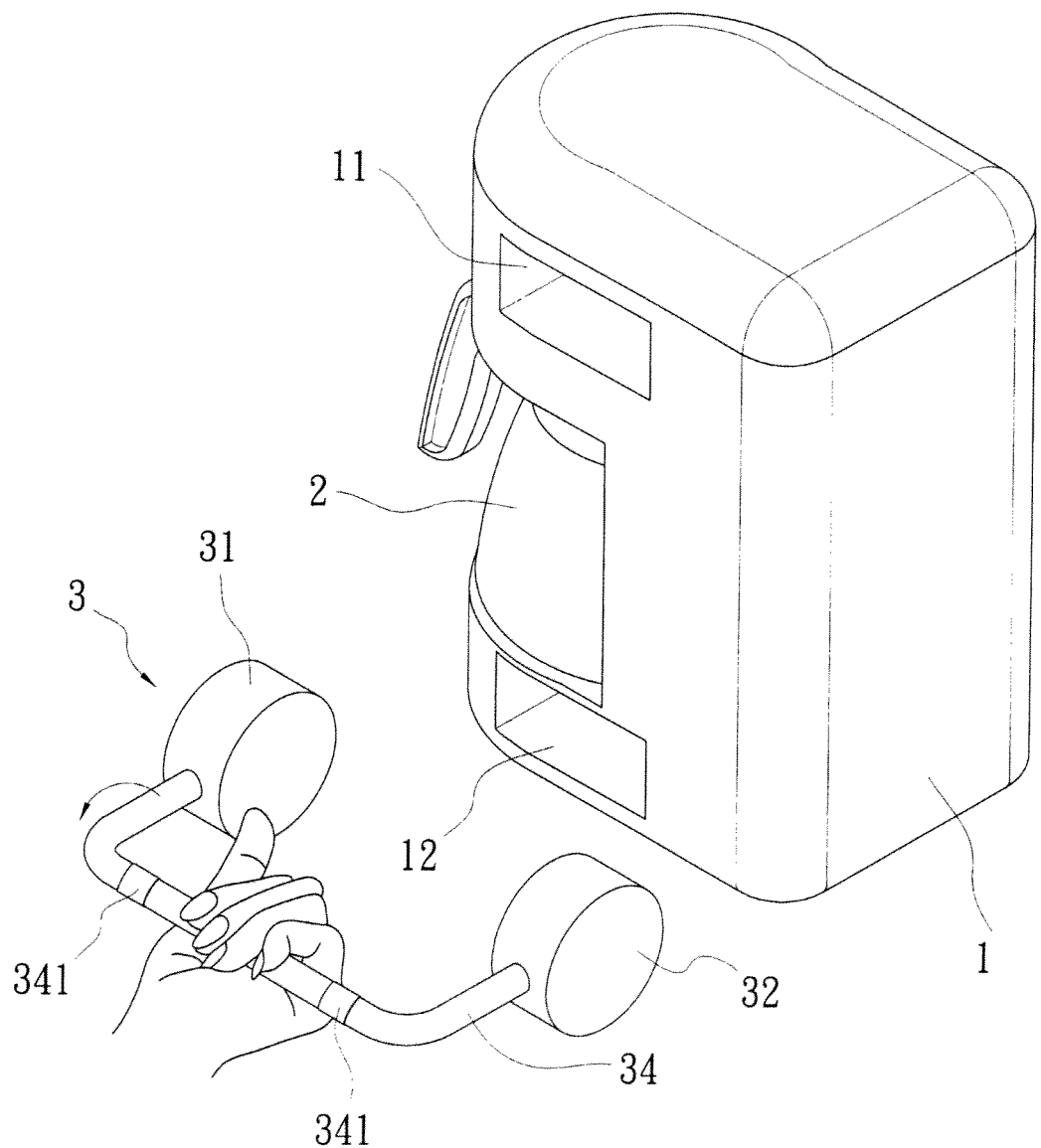
FIG. 5 is another view showing the action of usage and operation of the energy-saving and heat preservation device of the present invention.

Configured in this manner, when in implementation, as shown in FIG. 3, the first and the second chambers (31), (32) of the heat preservation device (3) are respectively accommodated in the upper and the lower receiving tanks (11), (12) respectively provided at the upper and lower ends of the heating device (1). The waste heat such as vapor generated in the heating process conducted by the heating device (1) is utilized to heat the first chamber (31) provided in the upper receiving tank (11), and thus the energy storage material (33), which is a type of reversible phase-change material, disposed therein is melted into liquid which then flows from the first chamber (31) through the conduit (34) into the second chamber (32) provided in the lower receiving tank (12) and is conducted with heat preservation process therein. After the heat absorbed by the liquid energy storage material (33) is gradually dispersed, the energy storage material (33) is solidified again into solid state, the phase change status can be observed by means of the heat discoloration patches provided on the surface of the conduit (34), and then the first and the second chambers (31), (32) integrally connected with the conduit (34) is taken out respectively from the upper and the lower receiving tanks (11), (12) of the heat preservation device (3) as shown in FIG. 4. In turn, the first chamber (31) and the second chamber (32) are rotated 180 degrees as shown in FIG. 5, and then the second chamber (32) are accommodated in the upper receiving tank (11) and the first chamber (31) in the lower receiving tank (12). Hence, the first chamber (31) originally located on the upper end is rotated to the lower end for heat preservation usage and the second chamber (32) originally located on the lower end is rotated to the upper end for energy storage usage so as to enable repeated usage in energy storage and heat preservation.

Based on the above description of constitution and implementation of the present invention, not only the exhausted waste heat, which later becomes heat load of air conditioning, can be reduced, but also the power consumption for heat preservation can be lowered. Therefore, the practical performance and features in its overall implementation can be enhanced.

Aforementioned embodiments and drawings are not to restrict the product structure or implementation modes. Appropriate variations and modifications done by the people having general knowledge in the art without departing from the scope and features of the present invention are considered to be still within the scope of the present invention.

What is claimed is:

1. An energy-saving and heat preservation device comprising:
    a heating device (1) for conducting heating connected with a receptacle (2), the heating device including an upper receiving slot (11) and a lower receiving slot (12);
    the receptacle (2) for receiving material to be heated including an upper end (21) and a lower end (22), the receptacle (2) being disposed between the upper and lower receiving slots (11), (12) during heating; and
    a heat preservation device (3) reversibly coupled to the heating device (1), the heat preservation device (3) including a first chamber (31) and a second chamber (32) wherein the first and second chambers (31),(32) are reversibly and interchangeably received within said upper and lower receiving slots (11), (12), said first and second chambers (31),(32) being in fluid communication one with the other through a conduit (34) extending between said first and second chambers (31), (32), wherein an energy storage material (33) received within said heat preservation device (3) is transferred between said first and second chambers (31), (32) through said conduit (34) as said energy storage material undergoes a reversible phase change from solid to liquid.

2. The energy-saving and heat preservation device as claimed in claim 1, wherein said energy storage material is paraffin.

3. The energy-saving and heat preservation device as claimed in claim 1, wherein heat discoloration patches(341) corresponding to said first and said second chambers (31), (32) are disposed on a surface of said conduit (34), so as to sense a phase change status of said energy storage material (33) between said first and said second chambers (31),(32).

* * * * *